US006735306B1

(12) United States Patent
Heinz

(10) Patent No.: US 6,735,306 B1

(45) Date of Patent: May 11, 2004

(54) INFRARED HELMET

(76) Inventor: Rüegg Heinz, Bürgliweg 13, CH-8805 Richterswil (CH)

( * ) Notice: Subject to any disclaimer, the term of this patent is extended or adjusted under 35 U.S.C. 154(b) by 0 days.

(21) Appl. No.: 09/762,199

(22) PCT Filed: Aug. 1, 1999

(86) PCT No.: PCT/CH99/00361

§ 371 (c)(1),
(2), (4) Date: Apr. 12, 2001

(87) PCT Pub. No.: WO00/08894

PCT Pub. Date: Feb. 17, 2000

(30) Foreign Application Priority Data

Aug. 3, 1998 (CH) .............................................. 1624/98

(51) Int. Cl.[7] ................................................ H04M 9/00

(52) U.S. Cl. ....................... 379/430; 455/600; 455/186; 455/89; 455/551; 381/56; 381/379; 381/74

(58) Field of Search ..................... 455/575.2; 379/430; 381/379

(56) References Cited

U.S. PATENT DOCUMENTS

| | | | | | |
|---|---|---|---|---|---|
| 3,862,379 | A | * | 1/1975 | Pless | 381/74 |
| 4,229,829 | A | * | 10/1980 | Grunwald | 398/122 |
| 4,247,952 | A | * | 1/1981 | Shibuya | 455/186.1 |
| 4,461,025 | A | * | 7/1984 | Franklin | 381/56 |
| 4,734,928 | A | * | 3/1988 | Weiner et al. | 455/551 |
| 5,590,417 | A | * | 12/1996 | Rydbeck | 455/575.2 |
| 2002/0025057 | A1 | * | 2/2002 | Benbenroth | 381/379 |

FOREIGN PATENT DOCUMENTS

| | | | |
|---|---|---|---|
| DE | 3325031 | 1/1985 | H04R/5/033 |
| EP | 0471477 | 2/1992 | H04B/1/16 |
| FR | 2280283 | 2/1976 | H04R/1/10 |
| GB | 2304488 | 3/1997 | H04R/5/033 |
| WO | 9535011 | 12/1995 | H04R/25/00 |

* cited by examiner

*Primary Examiner*—Ahmad F. Matar
*Assistant Examiner*—Sadiki Mwanyoha
(74) *Attorney, Agent, or Firm*—Antonelli, Terry, Stout & Kraus, LLP

(57) ABSTRACT

An infrared head set which is made as a chin bow receiver which is designed to pick up infrared signals and convert them into an audio transmission in the auditory range. This infrared head set includes a base housing (20*a–c*) and two bow ends (27) with one miniature speaker each located on the end side. The two bow ends (27) are supported in the base housing (20*a–c*) and can be elastically spread in at least one plane. The bow ends (27) are dynamically connected to at least one switch (5) housed in the lever action range of the plane. The switch turns on the receiving circuit for a certain spread position (12) of the bow ends (27) with the spread position (12) being dependent on wearing. Automatically turning reception on and off of the chin bow receiver dependent on wearing is advantageous. In addition, the head set contains audio management circuitry which automatically turns off when a certain audio quality is not reached and automatically turns on reception again as soon as audio transmission again has a fixed minimum quality.

28 Claims, 3 Drawing Sheets

INFRARED HELMET

BACKGROUND OF THE INVENTION

1. Field of the Invention

This invention relates to an infrared head set.

2. Description of the Prior Art

DE-33 25 031 C2 discloses an infrared head set which consists of two reproducing converters which are connected to one another via a chin bow, of an electrical circuit which picks up the infrared signals and converts them into audio signals, and of two microphones with downstream microphone amplifiers. The circuit of this infrared head set is made such that the signals tapped from the infrared circuit or the microphone amplifiers are selectively supplied individually or in combination to the reproducing converters. In doing so the microphones are arranged at a distance from one another on the chin bow such that they are located symmetrically to the medial plane of the head of the user, the signals tapped from the microphones being supplied opposite in phase in the same ratio to the microphone amplifier.

This infrared head set is conventionally dynamically connected to a transmitter which converts the emitted audio signals, for example from a television set or a HiFi system, into invisible infrared rays and emits them into space, where they are received by the infrared head set, with which wireless infrared audio transmission can be made available. Feasibly this transmitter is at the same time the charging station for the infrared receiver and for at least one battery insert which is used in the charged state for operation of the infrared head set.

Publication WO 95/35011 A discloses an infrared head set made as a chin bow receiver. This infrared head set consists essentially of a base housing, and of two bow ends with one miniature speaker located on the each end. The two ends of the bow are supported in the base housing, and they can be spread each in conjunction with a spring element which acts in the area of the support, with which via these spring elements comfortable ear insertion of the miniature speakers can be effected. Turning on and off in this headset is done by means of a hand-operated switch.

Publications GB 2 304 488 A and FR 2 280 283 A likewise disclose cable-free head sets in which the spreadable head bows likewise enable comfortable ear insertion, and into which an on/off switch is integrated, with on-and off-actuation which depends on the spread of the bow, with which manual actuation of the switch becomes superfluous.

SUMMARY OF THE INVENTION

The invention is an infrared head set with increased ease of operation, acceptance and the availability of one such device.

In an infrared head set which is also called a chin bow receiver, audio signals are received via invisible infrared radiation carrier which are amplified in the chin bow receiver via the miniature speakers which are attached to the two ends of the bow. The audio signals are relayed to the ears.

With the invention the ends of the bow are connected to the base housing, which on the end side are each equipped with one miniature speaker, and which form together a chin bow receiver, that are elastically spreadable in at least one plane by a supported guide. Thus, on the one hand comfortable ear-side insertion of the miniature speakers is achieved, on the other hand this controlled spreading leads to the chin bow receiver being automatically turned on by the spreading being dynamically connected to a switch which is placed preferably in the base housing. Furthermore, by this arrangement the wearing of the chin bow receiver dynamically connected to the arrangement of the miniature speakers is made comfortable by preventing uncomfortable pressure points on the parts of the ear being formed. When the chin bow receiver is laid down, it is automatically switched off. For the wearer this means that insertion takes place by grasping the two miniature speakers on the two ends of the bow and by controlled spreading of the two ends of the bow away from one another the miniature speakers are placed on the entries to the auditory canals. After this operation the user ascertains that the chin bow receiver has been automatically turned on. This on/off philosophy in addition preserves the battery charging and the preset loudness is maintained when the head set is put on again.

In similar existing products the receiver is switched by the user using a combined on/off switch and loudness controller. When turned off, the loudness controller is always turned to zero. In particular for users who are hard of hearing and for whom the device is especially well suited, after taking off the receiver it is often forgotten to be turned off. Upon re-use it is then ascertained that the battery energy is exhausted or the battery is dead, and the device is not longer immediately ready to operate. In addition, the user must again adjust the loudness appropriate to him each time it is turned on. These disadvantages are eliminated with the article of the invention.

A circuit in accordance with the invention in the chin bow receiver provides for automatic turn-off of the receiver to engage when the receiving quality falls below a certain quality tolerance boundary. This means that the wearer will always instinctively assume that receiving position which allows transfer based on the stipulated quality control. Accordingly if the chin bow receiver is located outside of the transmission area or the infrared beam is disrupted, the chin bow receiver turns off the disrupted audio transmission, but however instantaneously turns it on again as soon as the reception is again acceptable by the corresponding turning of the wearer in the direction of the transmitter. Thus the wearer is no longer burdened by undesirable and unpleasant audio distortions which essentially can greatly reduce the acceptance of the chin bow receiver.

The transmitted infrared rays are on only as long as a television program or music is being received. When the audio-emitting device is turned off, the transmitted infrared rays turn off after a few minutes.

With a well placed and easily operated switch in the transmitter which is not detailed, it is possible at any time to choose between mono or stereo audio transmission.

One embodiment of the invention is detailed below using the drawings. All features which are not important to the direct understanding of the invention have been omitted. The same features in the different figures are provided with the same reference numbers.

DETAILED DESCRIPTION OF THE EMBODIMENTS OF THE INVENTION

Figure 1:
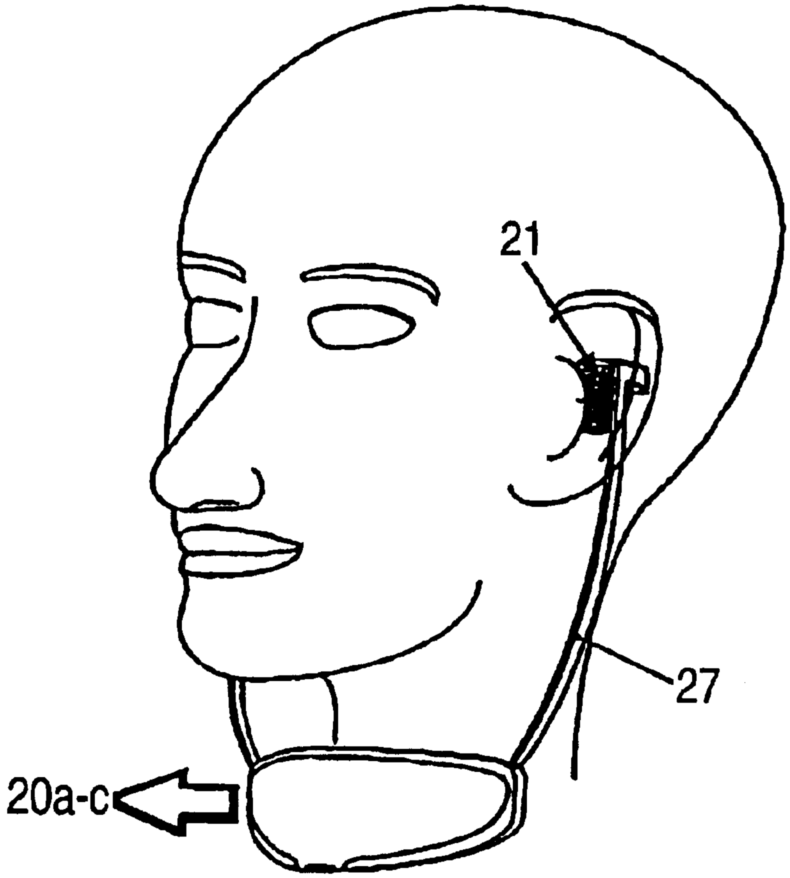
FIG. 1 shows the wearing of the chin bow receiver.

The following description is written as oriented to position, the aforementioned drawings being based on this description. FIG. 1 shows the chin bow receiver in use by a user. The base housing 20*a–c* of the chin bow receiver and the emplaced miniature speakers 21 are shown.

Figure 2:
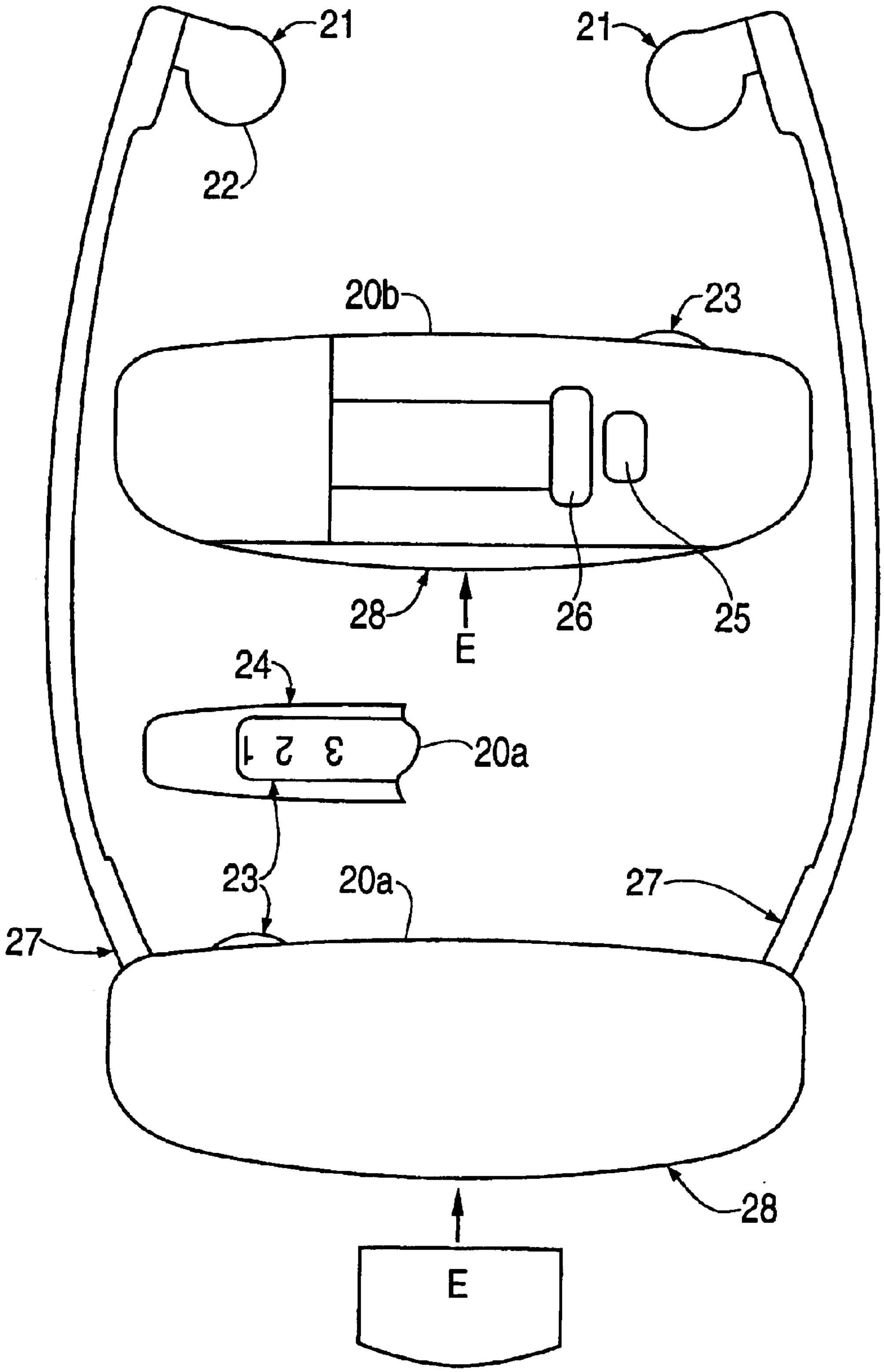
FIG. 2 shows the external configuration of the chin bow receiver.

FIG. 2 again shows the front side 20*a* of the chin bow receiver. The chin bow receiver is worn such that this front side 20*a* must always be pointed in the direction of the transmitter. Ordinarily this front side 20*a* is provided with an easily legible inscription which offers the wearer reliable assistance in correctly putting on the chin bow receiver. On the bottom side the base housing has an opening 28 into which an operating battery insert E is pushed. The geometrical configuration of the battery insert E is such that there is only one possibility for inserting the battery insert E on the correct side and completely into the chin bow receiver.

Item 20*b* identifies the back of the chin bow receiver. Audio transmission adjustments 25 and 26 are integrated into it. These adjustments are each made by a hearing consultant who optimally sets the audio transmission properties of the chin bow receiver to the specific hearing of the wearer.

Item 20*c* represents the top of the chin bow receiver. A loudness controller 23 is shown here and it is provided with adjustable loudness graduation which is identified by numbers, the mark 24 indicating the set graduation. Thus the user can always specifically set the loudness which is comfortable for the user. This loudness adjustment, which is attached on the top side of the chin bow receiver, is very easy to operate. When the chin bow receiver is worn correctly, the loudness controller 23 is located on the right side when viewed from the wearer.

Figure 3:
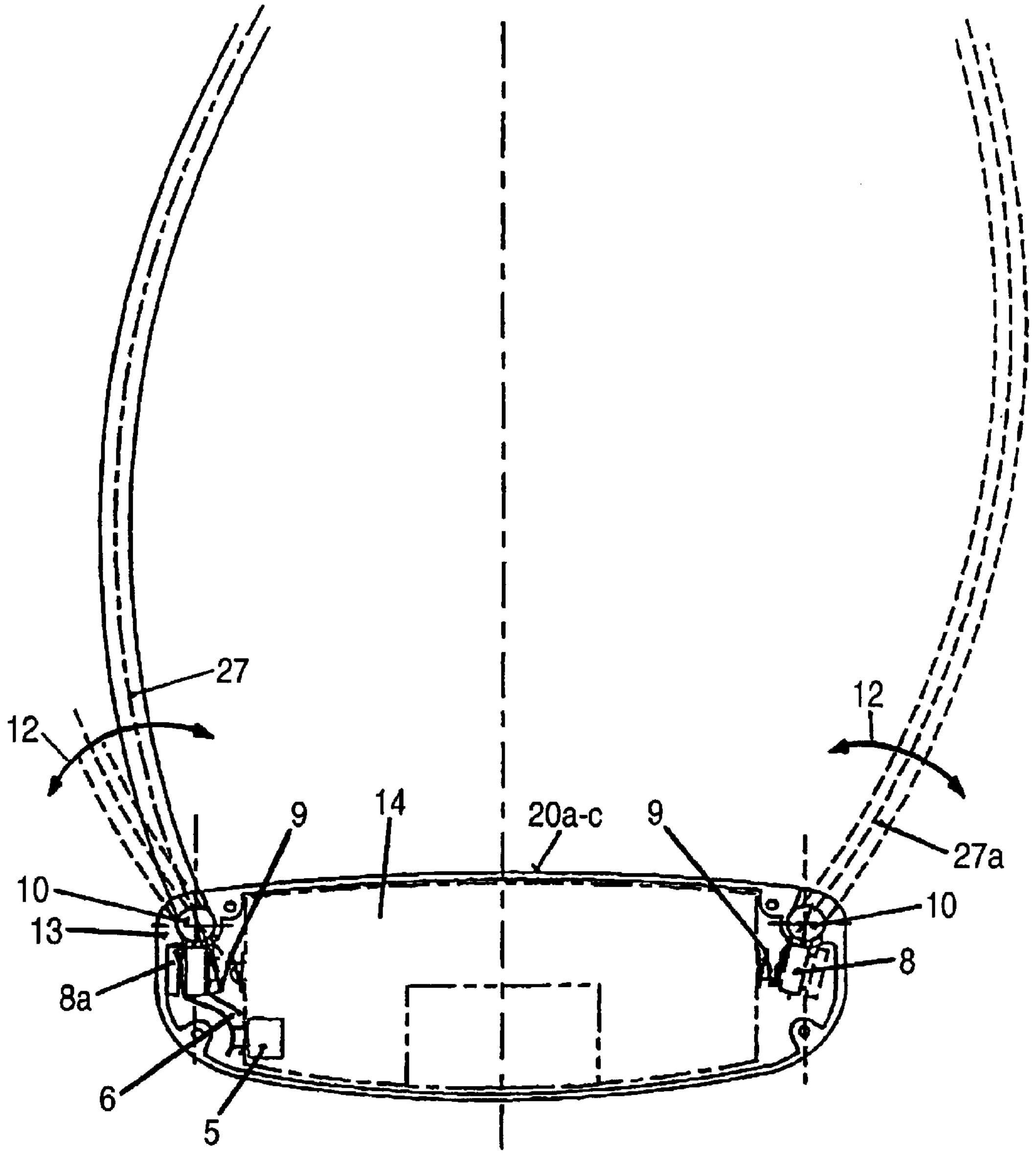
FIG. 3 shows the internal mechanism in conjunction with the ends of the bow which are made elastic.

Item 27 identifies the two bow ends which are supported to be able to elastically spread in the base housing 20*a–c* and are dynamically connected to a switch which is described in detail in conjunction with FIG. 3. This switch responds to the spread position of the bow ends 27 to cause the receiver circuit to be activated. The receiver circuit remains on to receive as long as the chin bow receiver is being worn. When the chin bow receiver is laid down, the bow ends 27 spring into a neutral position at which position the lever 6 rotates to a position to not engage the switch 5 to cause turning the receiver "off".

On the end side, the bow ends 27 with a skin-friendly cushion 22 each bear a miniature speaker 21. The miniature speakers 21 are inserted into the entries to the auditory canals and provide for excellent reception. The cushioning is also used to keep the miniature speaker 21 and its opening clean.

A circuit, which is not described in detail, but which is part of the chin bow receiver, provides for the receiver to be automatically turned off whenever the reception quality falls below a certain quality tolerance boundary. This means that the wearer instinctively always assumes or turns to that receiving position which allows transfer based on a stipulated quality control. Accordingly, if the chin bow receiver is located outside the transmission area or the infrared beam is being deflected, partially captured or disrupted, the chin bow receiver instantly turns off the disrupted audio transmission, but immediately turns on again as soon as reception is allowed again by the audio management which is installed as circuitry in the chin bow receiver, based on quality. Thus the wearer is no longer confronted with undesirable and unpleasant audio distortions when wearing the chin bow receiver.

FIG. 3 shows the turning on/off of reception of the chin bow receiver which was already briefly explained above, depending on the position of the ends 27 of the bow. Laterally a switch 5, which is triggered by an operating lever 6 with rotational positioning which is enabled by a correspondingly attached spring 9, interacts with circuitry on an electronic circuit board 14 which is located in the base housing. This spring 9 is held between a stop plate 8 and the side plane of the electronic circuit board 14. The stop plate 8 is a component of the operating lever 6. Another stop plate 8*a*, which lies in the same plane with the stop surface of the aforementioned stop plate 8 on the operating lever 6, is used as a path limitation of the elastic rotary motion 12, and therefore the spread position, in the plane of the ends 27 of the bow. The stop plate 8a is fixed to the side border 13 of the base housing. The operating lever 6 has a pivotal mount 10 on the top end of the base housing, provided with the corresponding lever action. In the neutral state of the ends 27 of the bow, the two stop plates 8, 8a adjoin one another, pressed together by the spring 9. The ends 27 of the bow assume a new position 27*a* by the spread position 12. The new position forms the wearing position of the chin bow receiver. Here the spring 9 is slightly compressed such that the lower end of the operating lever 6 rotates to contact the switch 5. The receiver of the electronic circuit board 14, which is dynamically connected to the switch 5, immediately switches on to receive as soon as the switch 5 is activated by the elastic rotary motion 12 of the ends 27 of the bow. In the neutral position of the ends 27 of the bow, reception is turned off. The ends 27 of the bow each have one spring 9 and the corresponding stop plates so that advantageous symmetrical elasticity can be achieved.

The head set described here has for obvious reasons been focussed on operating with infrared signals. Thus it should in no way remain precluded that this head set can of course also be used to receive and convert other wireless signals, for example radio signals. Only the specific electronic components then vary from case to case. These signal-dictated adaptations change nothing in the basic structure of the head set described as claimed in the invention.

What is claimed is:

1. A wireless chin bow receiver which is worn as a headset by a user to receive wireless audio transmissions in the human auditory range comprising:

a housing containing a wireless receiver which receives signals carrying the audio transmissions;

a pair of bow ends respectively attached with pivots at one end of the bow ends to the housing at spaced apart locations, the bow ends pivoting in at least one plane to spread apart another end of the bow ends, each bow end including a speaker at the another end which contacts an outer portion of an ear of the user when listening to the audio transmission;

a pair of springs respectively biasing each bow end in a neutral position at which the receiver is turned off;

an operating lever which rotates in associate with one of the bow ends about the pivot of one of the bow ends which controls opening and closing of a switch; and wherein the switch is engaged by rotation of the operating lever about the pivot to control turning the receiver on and off, the receiver being off when the bow ends are in the neutral position and the receiver being on when the bow ends spread from the neutral position against the bias of the springs to permit the speakers to engage the ears of the user.

2. A receiver in accordance with claim 1 wherein:

the operating lever is dynamically connected to one of the springs.

3. A receiver in accordance with claim 2 wherein the switch is electrically connected to an electronic circuit board including the wireless receiver to control turning on and off the wireless receiver.

4. A receiver in accordance with claim 1 wherein:

the springs are compressed when the another ends of the bow ends are spread from the neutral position by the user wearing the receiver.

5. A receiver in accordance with claim 2 wherein:

the springs are compressed when the another ends of the bow ends are spread from the neutral position by the user wearing the receiver.

6. A receiver in accordance with claim 3 wherein:

the springs are compressed when the another ends of the bow ends are spread from the neutral position by the user wearing the receiver.

7. A receiver in accordance with claim 1, comprising a switch permitting the user to select mono or stereo reception.

8. A receiver in accordance with claim 1 wherein the wireless transmissions comprise an infrared carrier.

9. A receiver in accordance with claim 2 wherein the wireless transmissions comprise an infrared carrier.

10. A receiver in accordance with claim 3 wherein the wireless transmissions comprise an infrared carrier.

11. A receiver in accordance with claim 4 wherein the wireless transmissions comprise an infrared carrier.

12. A receiver in accordance with claim 5 wherein the wireless transmissions comprise an infrared carrier.

13. A receiver in accordance with claim 6 wherein the wireless transmissions comprise an infrared carrier.

14. A receiver in accordance with claim 7 wherein the wireless transmissions comprise an infrared carrier.

15. A receiver in accordance with claim 1 wherein the wireless transmissions comprise:

a radio carrier.

16. A receiver in accordance with claim 2 wherein the wireless transmissions comprise:

a radio carrier.

17. A receiver in accordance with claim 3 wherein the wireless transmissions comprise:

a radio carrier.

18. A receiver in accordance with claim 4 wherein the wireless transmissions comprise:

a radio carrier.

19. A receiver in accordance with claim 5 wherein the wireless transmissions comprise:

a radio carrier.

20. A receiver in accordance with claim 6 wherein the wireless transmissions comprise:

a radio carrier.

21. A receiver in accordance with claim 7 wherein the wireless transmissions comprise:

a radio carrier.

22. A receiver in accordance with claim 1 comprising:

the receiver includes audio circuitry which is automatically turned off when audio transmissions are received below a set audio quality and automatically turns on the audio circuitry when the audio transmission is again received above the set audio quality.

23. A receiver in accordance with claim 2 comprising:

the receiver includes audio circuitry which is automatically turned off when audio transmissions are received below a set audio quality and automatically turns on the audio circuitry when the audio transmission is again received above the set audio quality.

24. A receiver in accordance with claim 3 comprising:

the receiver includes audio circuitry which is automatically turned off when audio transmissions are received below a set audio quality and automatically turns on the audio circuitry when the audio transmission is again received above the set audio quality.

25. A receiver in accordance with claim 4 comprising:

the receiver includes audio circuitry which is automatically turned off when audio transmissions are received below a set audio quality and automatically turns on the audio circuitry when the audio transmission is again received above the set audio quality.

26. A receiver in accordance with claim 5 comprising:

the receiver includes audio circuitry which is automatically turned off when audio transmissions are received below a set audio quality and automatically turns on the audio circuitry when the audio transmission is again received above the set audio quality.

27. A receiver in accordance with claim 6 comprising:

the receiver includes audio circuitry which is automatically turned off when audio transmissions are received below a set audio quality and automatically turns on the audio circuitry when the audio transmission is again received above the set audio quality.

28. A receiver in accordance with claim 7 comprising:

the receiver includes audio circuitry which is automatically turned off when audio transmissions are received below a set audio quality and automatically turns on the audio circuitry when the audio transmission is again received above the set audio quality.

* * * * *